(12) United States Patent
Raither et al.

(10) Patent No.: US 12,071,178 B2
(45) Date of Patent: Aug. 27, 2024

(54) PLAIN BEARING FOR A COUPLING ROD OF A STEER-BY-WIRE STEERING GEAR

(71) Applicants: thyssenkrupp Presta AG, Eschen (LI); thyssenkrupp AG, Essen (DE)

(72) Inventors: Wolfram Raither, Sevelen (CH); Philippe Steck, Gamprin-Bendern (LI)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 629 days.

(21) Appl. No.: 17/274,475

(22) PCT Filed: Oct. 4, 2019

(86) PCT No.: PCT/EP2019/076905
§ 371 (c)(1),
(2) Date: Mar. 9, 2021

(87) PCT Pub. No.: WO2020/074385
PCT Pub. Date: Apr. 16, 2020

(65) Prior Publication Data
US 2022/0048561 A1  Feb. 17, 2022

(30) Foreign Application Priority Data
Oct. 9, 2018  (DE) .................... 10 2018 124 905.5

(51) Int. Cl.
*B62D 3/12*      (2006.01)
*B62D 5/04*      (2006.01)
(Continued)

(52) U.S. Cl.
CPC ............ *B62D 3/126* (2013.01); *B62D 5/0448* (2013.01); *F16C 3/035* (2013.01); *F16C 29/02* (2013.01);
(Continued)

(58) Field of Classification Search
CPC .............................. B62D 5/0445; B62D 3/126
See application file for complete search history.

(56) References Cited

U.S. PATENT DOCUMENTS 6,097,286 A * 8/2000 Discenzo ............... B62D 6/008
340/576
6,220,385 B1   4/2001 Bohner
(Continued)

FOREIGN PATENT DOCUMENTS

CN          1493795 A       5/2004
CN        101410638 A       4/2009
(Continued)

OTHER PUBLICATIONS

English Translation of International Search Report issued in PCT/EP2019/076905, dated Jan. 29, 2020.

*Primary Examiner* — Kevin Hurley
(74) *Attorney, Agent, or Firm* — thyssenkrupp North America, LLC

(57) ABSTRACT

A steering gear for a steer-by-wire steering system of a motor vehicle may include a coupling rod mounted in a steering gear housing. A threaded spindle may be formed on the coupling rod and surrounded by a spindle nut as part of a spiral gear. The coupling rod may be displaceable along a longitudinal axis by way of the spiral gear. The coupling rod can be mounted in the steering gear housing by way of a plain bearing so as to be displaceable along the longitudinal axis. The plain bearing is configured to compensate for thermal expansions between the steering gear housing and the spindle nut.

20 Claims, 3 Drawing Sheets

(51) Int. Cl.
 *F16C 3/035* (2006.01)
 *F16C 29/02* (2006.01)
 *F16C 33/20* (2006.01)
 *F16C 35/02* (2006.01)
(52) U.S. Cl.
 CPC ............ *F16C 33/201* (2013.01); *F16C 35/02* (2013.01); *F16C 2202/22* (2013.01); *F16C 2326/24* (2013.01)

(56) References Cited

U.S. PATENT DOCUMENTS

| | | | |
|---|---|---|---|
| 9,969,422 B2 * | 5/2018 | Yamamoto | B62D 5/0424 |
| 2002/0085778 A1 | 7/2002 | Mena | |
| 2008/0088104 A1 | 4/2008 | Arlt | |
| 2012/0165106 A1 | 6/2012 | Eltner | |
| 2013/0248280 A1 * | 9/2013 | Stamm | B62D 5/0451 |
| | | | 180/444 |
| 2015/0274193 A1 | 10/2015 | Saito | |
| 2017/0158221 A1 | 6/2017 | Yamamoto | |
| 2019/0315391 A1 | 10/2019 | Illés et al. | |

FOREIGN PATENT DOCUMENTS

| | | | | |
|---|---|---|---|---|
| CN | 101858418 A | | 10/2010 | |
| CN | 104806634 A | | 7/2015 | |
| CN | 104943734 A | | 9/2015 | |
| CN | 105074238 A | | 11/2015 | |
| CN | 106273229 B | | 1/2017 | |
| CN | 107031700 A | | 8/2017 | |
| DE | 198 05 015 C | | 7/1999 | |
| DE | 202005007923 U1 | * | 9/2005 | ............ B62D 3/12 |
| DE | 10 2008 002 176 A | | 12/2009 | |
| DE | 102010020229 A1 | * | 11/2011 | ............ B62D 3/12 |
| DE | 10 2011 119 724 A1 | | 6/2013 | |
| EP | 1 911 658 A | | 4/2008 | |
| EP | 2 625 089 B | | 1/2015 | |
| FR | 2 862 592 A | | 5/2005 | |
| JP | 2003291831 A | * | 10/2003 | ............ B62D 3/126 |
| JP | 2004132511 A | | 4/2004 | |
| JP | 2015013562 A | | 1/2015 | |
| KR | 2014 0112937 A | | 9/2014 | |
| WO | 2017/220717 A1 | | 12/2017 | |

* cited by examiner

PLAIN BEARING FOR A COUPLING ROD OF A STEER-BY-WIRE STEERING GEAR

CROSS REFERENCE TO RELATED APPLICATIONS

This application is a U.S. National Stage Entry of International Patent Application Serial Number PCT/EP2019/076905, filed Oct. 4, 2019, which claims priority to German Patent Application No. DE 10 2018 124 905.5, filed Oct. 9, 2018, the entire contents of both of which are incorporated herein by reference.

FIELD

The present disclosure generally relates to steer-by-wire steering systems and to steering gears for steer-by-wire steering systems of motor vehicles.

BACKGROUND

In steer-by-wire steering systems, the position of the steered wheels is not directly coupled to the steering input means, for example a steering wheel. A connection between the steering wheel and the steered wheels is made via electrical signals. The driver's steering request is detected by a steering angle sensor, and depending on the driver's steering request, the position of the steered wheels is controlled via a steering actuator.

In electromechanical steering gear systems, anti-twist protection and mounting of a toothed rack of a rack-and-pinion steering gear are provided by the interplay with a pressure piece which presses the toothed rack against a pinion. Such an anti-twist device is disclosed for example in patent specification DE 198 05 015 C1.

Owing to the absence of a rack-and-pinion steering gear in steer-by-wire steering systems, a new solution must be developed for the anti-twist protection of a coupling rod.

Thus, a need exists for a steering gear for a steer-by-wire steering system of a motor vehicle in which the coupling rod can easily be protected against torsion.

DETAILED DESCRIPTION

Figure 1:
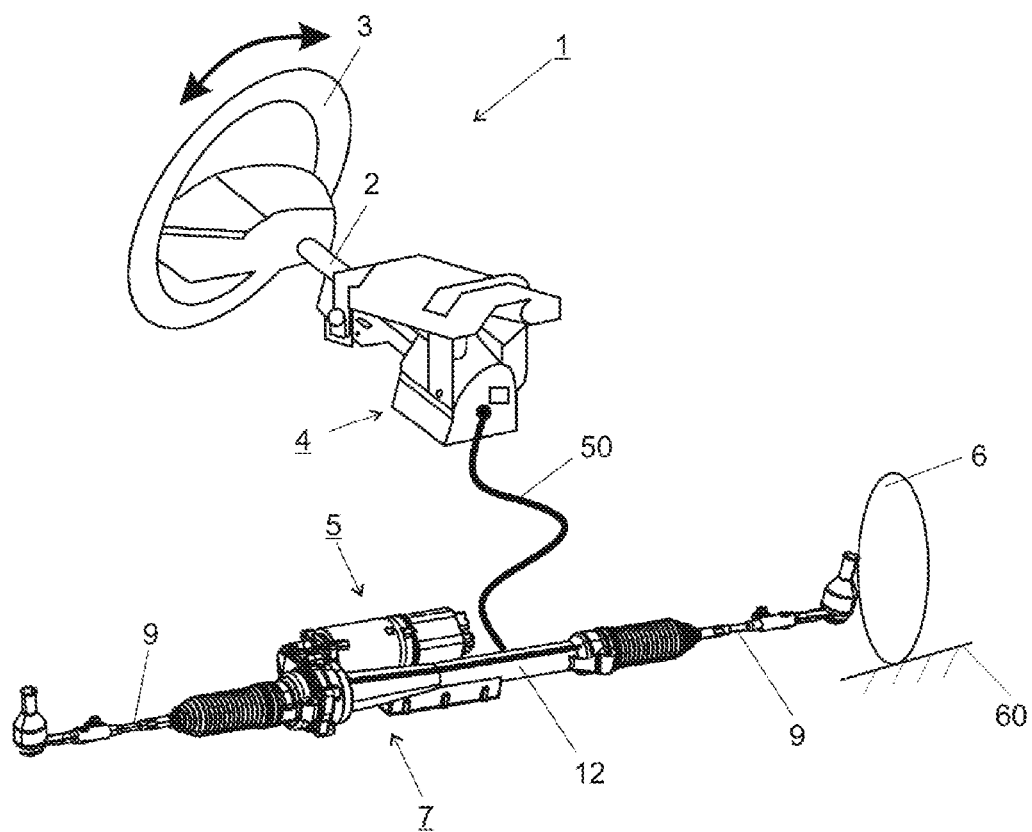
FIG. 1 is a schematic view of an example steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a steering gear is provided for a steer-by-wire steering system of a motor vehicle, comprising a coupling rod which is mounted in a steering gear housing and on which a threaded spindle is formed that is surrounded by a spindle nut as part of a spiral gear, wherein the coupling rod is displaceable along the longitudinal axis by means of the spiral gear, and wherein the coupling rod is mounted in the steering gear housing by means of a plain bearing so as to be displaceable along a longitudinal axis, wherein the plain bearing is configured to compensate for thermal expansions between the steering gear housing and the spindle nut. By means of the plain bearing, the backlash between the coupling rod and the plain bearing may be adjusted so as to achieve optimal tribological and acoustic performance of the steering gear. Preferably, the plain bearing is designed to set the backlash between the coupling rod and the steering gear housing within defined limit values over an operating temperature range. In particular, the plain bearing bushing is preferably made of a plastic, POM, PA, PEEK, PTFE or has a plastic coating, particularly preferably PA66GF30 (polyamide 66 with glass-fiber reinforcement at 30% by volume).

The plain bearing may be made as one piece or from multiple pieces. It may be attached to the coupling rod and/or the steering gear housing by means of integrated or additional elastic elements. The geometry of the coupling rod in the function region of the bearing may be optimized for production by forming or material removal, depending on the production concept. Furthermore, an emergency run function in the event of great wear or damage to the plain bearing may be provided, e.g. via direct contact between the coupling rod and the steering gear housing above a specific torsion angle.

Preferably, the spiral gear is a ball screw drive.

The plain bearing is preferably connected by form fit to the steering gear housing, and the sliding faces by which the plain bearing is in contact with the coupling rod are preferably configured such that the plain bearing, in interplay with the coupling rod, forms an anti-twist device.

In a preferred embodiment, the plain bearing comprises a plain bearing bushing which surrounds the coupling rod. Such a plain bearing bushing is particularly compact as it takes up little space.

Preferably, the coupling rod is made of steel and the steering gear housing is made of aluminum.

In the preferred embodiment, the plain bearing bushing is made from a material which has a thermal expansion coefficient in a range from $2 \cdot 10^{-5}$ $K^{-1}$ to $5 \cdot 10^{-4}$, preferably greater than $2 \cdot 5 \cdot 10^{-5}$ $K^{-1}$ and in particular between $2 \cdot 5 \cdot 10^{-5} K^{-1}$ and $4 \cdot 10^{-4} K^{-1}$.

The plain bearing bushing is preferably substantially cylindrically shaped and has a centrally arranged opening, the cross section of which deviates from the circular form and which receives a corresponding non-round portion of the coupling rod in the mounted state so as to form an anti-twist device, achieving firstly a form fit in the circumferential direction and secondly an adequate centering between the plain bearing bushing and coupling rod. The term "cylindrical" should be understood in the mathematical sense and describes a form with two congruent base surfaces which are connected together by a casing surface. The term "non-round" in this definition means that the base surfaces are not circles. The opening, or the coupling rod in the engagement region with the plain bearing bushing, may be formed as a regular or irregular polygon or as a polygonal profile. It may be provided that the plain bearing bushing has notches starting from a first end face, extending into the casing surface and running parallel to the longitudinal direction, by means of which the expansion behavior of the plain bearing bushing may be influenced. Preferably, on the outside, spring arms may be provided which are evenly spaced apart in the circumferential direction and, in the installed state of the plain bearing bushing, bear on the steering gear housing to allow vibration damping and axial locking of the plain bearing bushing. Preferably, at least two spring arms are provided; particularly preferably, three spring arms are provided. It is advantageous here if the spring arms are arranged on the outside between or in recesses of the plain bearing bushing, extend parallel to the longitudinal direction and—viewed radially—lie in the region of the circular envelope, also known as the envelope circle, of the plain bearing bushing. Preferably, at their free ends, the spring arms have protrusions which protrude outwardly from the envelope and hence, in the installed state, bear with their outside fully superficially on the steering gear housing. In an advantageous embodiment, the spring arms extend approximately from the middle of the casing height of the plain bearing bushing to a second end of the plain bearing bushing, wherein the second end lies along the longitudinal axis on an opposite side from the first end face assigned to a first end.

Preferably, a seat in the steering gear housing for the plain bearing bushing is formed substantially cylindrically in cross-section and has grooves extending in the longitudinal direction, in which corresponding webs on the outside of the plain bearing bushing engage to form the anti-twist device.

Furthermore, a steer-by-wire steering system for a motor vehicle is provided, comprising:
 a steering gear acting on the steered wheels,
 a control unit,
 a feedback actuator which can be applied by a driver with a driver's request for a steering angle via a steering input means and emits a feedback signal to the steering input means as a reaction to the driver's request and a driving state of the motor vehicle,
 a device for signal transmission which transmits the driver's request to the control unit,
wherein the control unit controls the steering gear in order to transform the driver's request into a deflection of the steered wheels, and wherein the steering gear is configured as described above. Here, it is advantageous if the coupling rod is connected to tie rods for steering the wheels of the motor vehicle.

FIG. 1 shows a steer-by-wire steering system 1. A rotary angle sensor (not shown) is arranged on a steering shaft 2 and detects the driver's steering angle that is applied by rotation of the steering input means 3, which in this example is formed as a steering wheel. However, in addition, a steering moment may be detected. The steering input means may also be a joystick. Furthermore, a feedback actuator 4 is arranged on the steering shaft 2, which serves to simulate the feedback from a road surface 60 to the steering wheel 3 and thus gives the driver feedback on the steering and driving behavior of the vehicle. The driver's steering request is transmitted to a feedback actuator monitor unit (not shown) via the rotary angle of the steering shaft 2 which is measured by the rotary angle sensor. The feedback actuator monitor unit transmits the driver's steering request to a control unit. The feedback actuator monitoring unit preferably also controls the feedback actuator 4. The feedback actuator monitor unit may also be formed integrally with the control unit. Depending on the signal from the rotary angle sensor and further input parameters, the actuator unit actuates an electric steering actuator 5 which controls the position of the steered wheels 6. The steering actuator 5 is part of a steering gear 7 which comprises a coupling rod that is mounted so as to be movable in a steering gear housing 8. The coupling rod acts indirectly on the steered wheels 6 via tie rods 9 and other components.

Figure 2:
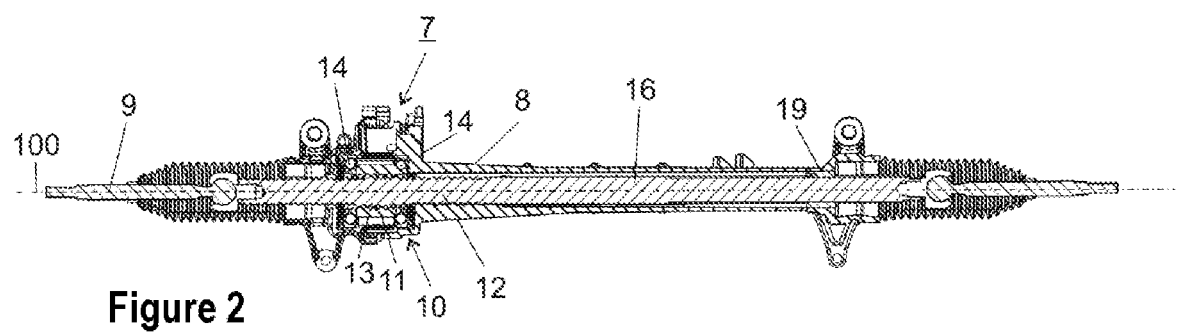
FIG. 2 is a longitudinal sectional view through an example steering gear with a ball screw drive and coupling rod.
Figure 3:
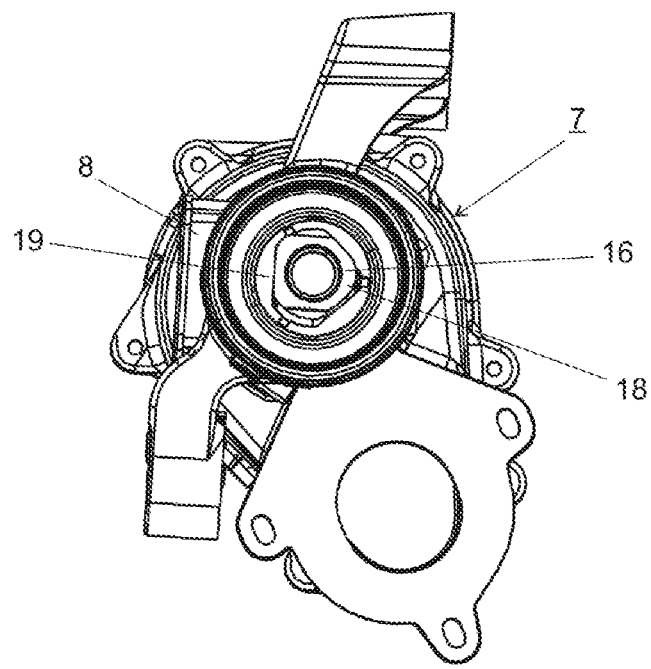
FIG. 3 is a top view of an end of the coupling rod.

FIG. 2 shows a longitudinal section through a steering gear 7 according to the invention with a drivable ball screw drive 10. A ball nut 11 is arranged coaxially to the longitudinal axis 100 of the steering gear 7, and a ball screw spindle 12 formed on a coupling rod 16 passes through said ball nut coaxially to the longitudinal axis 100. A torque may be transmitted from the ball nut 11 via balls 13 to the ball screw spindle 12. The ball nut 11 is mounted rotatably in the steering gear housing 8 by means of two ball-bearings 14. A rotary movement of the ball nut 11 is transformed into a translational movement of the ball screw spindle 12 along the longitudinal axis 100. FIG. 3 shows the steering gear 7 in a top view onto the end of the coupling rod 16 remote from the ball screw. In this region, the coupling rod 16 has a non-round profile in cross-section.

Figure 4:
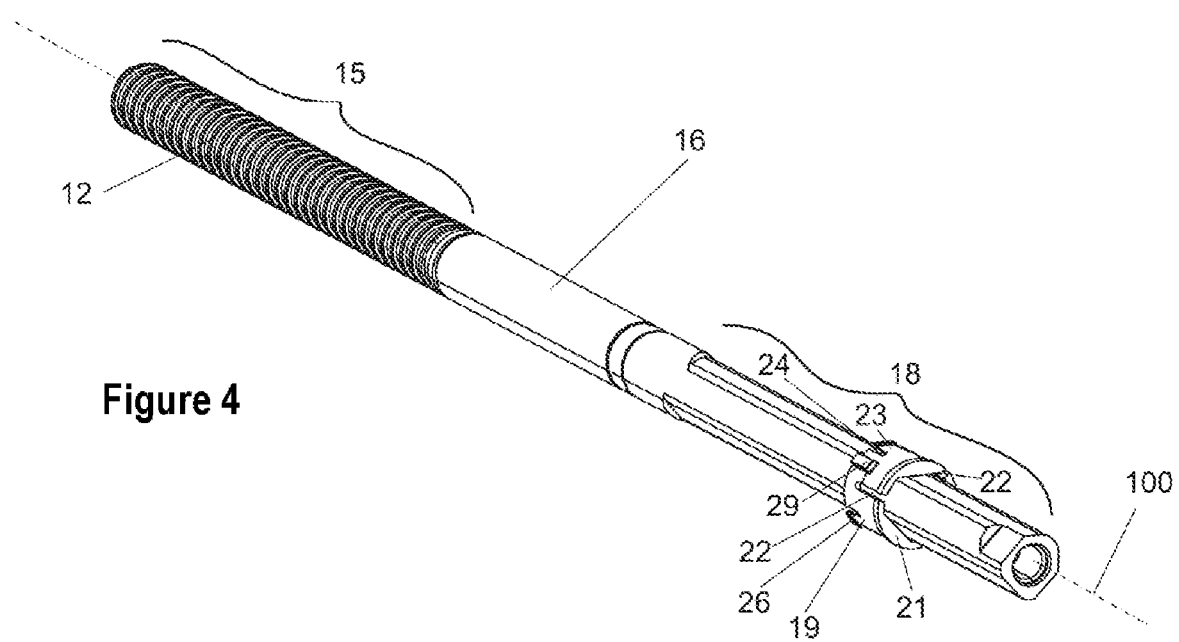
FIG. 4 is a perspective view of the coupling rod.

As shown in FIG. 4, the ball screw spindle 12 is formed on a first end region 15 of the coupling rod 16. The coupling rod 16 is mounted displaceable in the steering gear housing (not shown) by means of a plain bearing bushing 19, at a second end region 18 opposite the first end region along the longitudinal axis 100. In the second end region 18, the coupling rod 16 has a non-round profile in cross-section which, in interplay with the plain bearing bushing 19, forms an anti-twist device. In particular, the outer peripheral face of the coupling rod in the end region 18 is non-round and constitutes a pentagon, corresponding to the inner face of the plain bearing bushing 19.

Figure 5A:
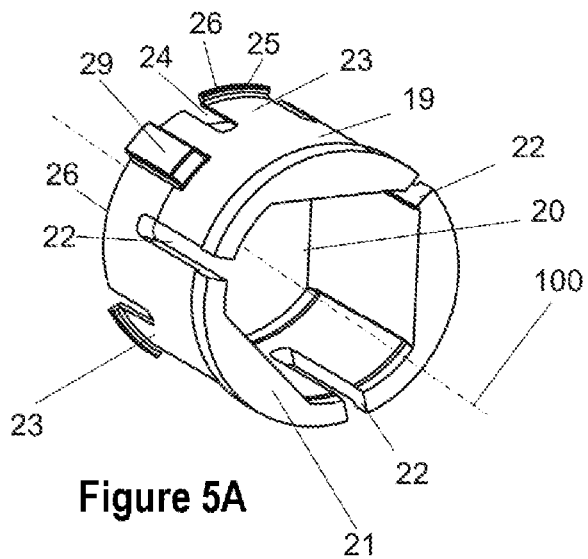
FIG. 5A is a first perspective view of a plain bearing bushing of the coupling rod.
Figure 5B:
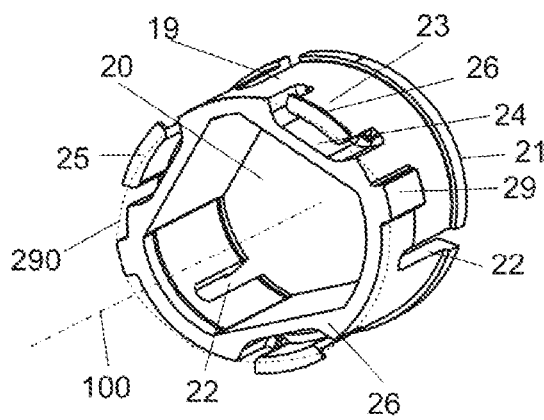
FIG. 5B is a second perspective view of a plain bearing bushing of the coupling rod.
Figure 5C:
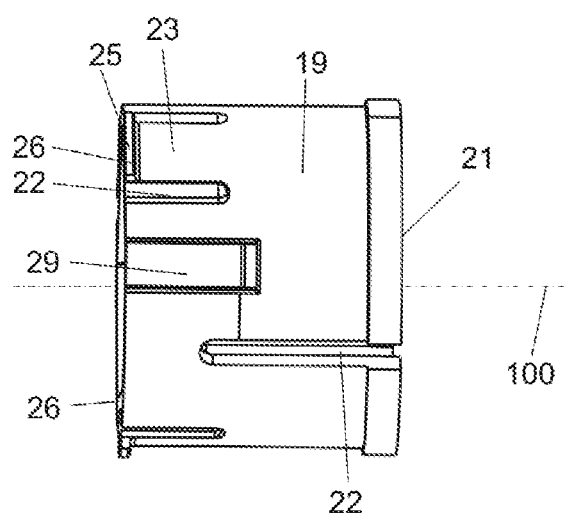
FIG. 5C is a third perspective view of a plain bearing bushing of the coupling rod.

As shown in FIGS. 5A to 5C, the plain bearing bushing 19 is substantially cylindrical. In the middle it has an opening 20, the cross section of which deviates from the circular form, and in which the corresponding non-round portion of the coupling rod 16 is received in the mounted state so as to form an anti-twist device. The geometry of the interfaces between the coupling rod and the plain bearing bushing (sliding face), and between the plain bearing bushing and the steering gear housing, is configured such that the torque can be transmitted from the coupling rod to the steering gear housing, and a defined torsional backlash and defined torsional stiffness may be set. The plain bearing bushing 19 has notches 22 starting from a first end face 21, extending into the casing surface and running parallel to the longitudinal direction 100, by means of which the expansion behavior of the plain bearing bushing 19 may be influenced. Also, on the outside of the plain bearing bushing 19, spring arms 23 are provided which are evenly spaced in the circumferential direction and, in the installed state, bear on the steering gear housing 8 to allow vibration damping. The spring arms 23 are arranged on the outside between recesses 24 of the plain bearing bushing 24. The spring arms 23 here extend parallel to the longitudinal direction 100 and, viewed radially, lie in the region of the circular envelope 290 of the plain bearing bushing 19. At their free ends, the spring arms 23 have protrusions 25 which protrude from the envelope 290 and thus, in the installed state, bear with their outside 26 fully superficially on the steering gear housing 8. The spring arms 23 extend approximately from the middle of the casing height of the plain bearing bushing to a second end of the plain bearing bushing 26, wherein the second end 30 lies on an opposite side along the longitudinal axis from a first end face 21 assigned to the first end. As shown in FIG. 4, in the installed state, the second end 30 is oriented pointing towards the ball screw drive.

Figure 6:
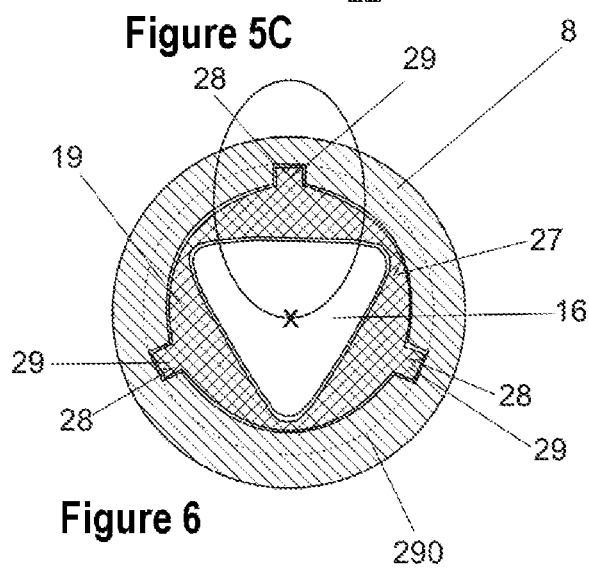
FIG. 6 is a cross sectional view through a plain bearing bushing and a coupling rod in another example.
Figure 6A:
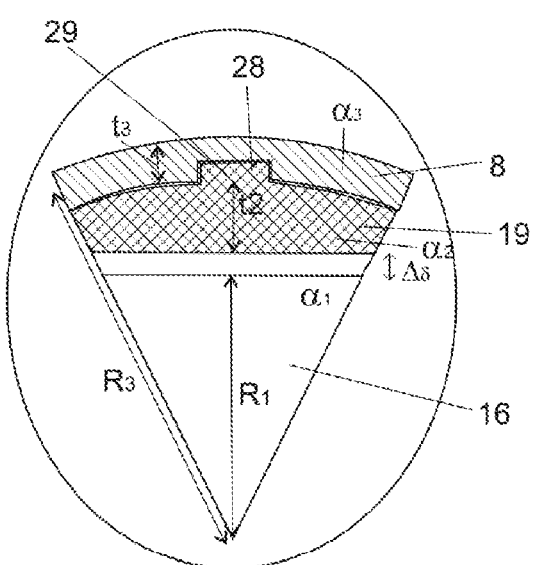
FIG. 6A is a detail view of FIG. 6.

FIGS. 6 and 6A show the plain bearing bushing 19 installed in the steering gear housing 8, and the coupling rod 16 surrounded by the plain bearing bushing 19, in a further embodiment. The plain bearing bushing 19 is connected by form fit to the steering gear housing 8. The seat 27 in the steering gear housing 8 is formed substantially cylindrically in cross-section and has grooves 28 extending in the longitudinal direction 100, in which corresponding webs 29 on the outside of the plain bearing bushing 19 engage in order to form the anti-twist device. The webs 29 are evenly spaced around the periphery. The exemplary embodiment shows three webs 29. The webs 29, like the spring arms, extend only over part of the casing height of the plain bearing bushing 19 (see FIGS. 5A-5C), preferably approximately half. They are assigned to the same end 26 as the spring arms 23. In the exemplary embodiment shown, the coupling rod 16 has a triangular shape. The invention is not restricted to this shape of the coupling rod. Other shapes are conceivable which also have a non-round geometry and are suitable for a plain bearing and for anti-twist protection.

The coupling rod 16 and the steering gear housing 8 are made of different materials. The coupling rod 16 is made in particular of steel and the steering gear housing 8 of aluminum. The two components therefore have different thermal expansion coefficients. The plain bearing bushing 19 is configured to set the backlash b between the coupling rod 16 and the steering gear housing 8 within defined limit values $\delta_{min}\varepsilon\varepsilon_{max}$ over an operating temperature range $T_{min}$ to $T_{max}$. The plain bearing bushing 19 thus compensates for the thermal expansions of the coupling rod 16 and the plain bearing bushing 19. The plain bearing bushing 19 is preferably made of a material which has a greater thermal expansion than aluminum and steel. In particular, the plain bearing bushing 19 is preferably made of a plastic, POM, PA, PEEK, PTFE, or has a plastic coating, particularly preferably of PA66GF30 (polyamide 66 with glass-fiber reinforcement at 30% by volume).

If for example the thermal expansion of the coupling rod 16 over the entire temperature range causes a change in the backlash value $\Delta\delta 1$, and the thermal expansion of the steering gear housing 8 causes a change $\Delta\delta 3$, the plain bearing bushing must allow a backlash change $\Delta\delta=-\Delta\delta 1-\Delta\delta 3$ in order to achieve compensation within said limits.

FIG. 6A shows the two-dimensional case at which the thermal expansion depends only on the radii, the wall thicknesses in the radial direction and the thermal expansion coefficients of the three components of coupling rod 16, plain bearing bushing 19 and steering gear housing 8. In this case (and with simplified rotationally symmetrical geometry), the backlash change $\Delta\delta$ to be compensated by the plain bearing bushing over a temperature interval $\Delta T$ is:

$$\Delta\delta = \Delta T \cdot \alpha_2 \cdot t_2 = \Delta T \cdot \left[\alpha_3 \cdot \left(R_3 - \frac{t_3}{2}\right) - \alpha_1 \cdot R_1\right],$$

where
- $\alpha_1$ thermal expansion coefficient of the coupling rod 16,
- $\alpha_2$ thermal expansion coefficient of the plain bearing bushing 19,
- $\alpha_3$ thermal expansion coefficient of the steering gear housing 8,
- $R_1$ outer radius of the coupling rod 16,
- $R_3$ inner radius of the steering gear housing 8 in the region of the grooves 28 with respect to the middle of the housing wall thickness,
- $t_2$ wall thickness of the plain bearing bushing 19 in the radial direction in a region outside the webs 29, and
- $t_3$ wall thickness of the steering gear housing 8 in the radial direction in a region outside the grooves 28.

The formula gives the optimal dimensioning of the plain bearing bushing with respect to thermal expansion coefficient $\alpha_2$ and wall thickness $t_2$.

In the real case, the thermal expansion of the plain bearing bushing 19 is additionally influenced by the peripheral conditions of the three-dimensional geometry such as the steering gear housing connection and in particular the number, length and width of the cutouts/slots in the plain bearing bushing, so the optimal thermal expansion coefficient and optimal geometry of the bushing must be determined numerically.

For a given range of geometric parameters (radii, wall thicknesses) there is therefore a value range for the thermal expansion coefficients $\alpha_2$ (length expansion coefficient) of the plain bearing bushing, of: $2 \cdot 10^{-5} K^{-1}$ to $5 \cdot 10^{-4} K^{-1}$.

What is claimed is:

1. A steering gear for a steer-by-wire steering system of a motor vehicle, the steering gear comprising:
   a coupling rod mounted in a steering gear housing, wherein a threaded spindle is formed on the coupling rod and is surrounded by a spindle nut as part of a spiral gear, wherein the coupling rod is comprised of steel, wherein the steering gear housing is comprised of aluminum; and
   a plain bearing that mounts the coupling rod in the steering gear housing such that the coupling rod is displaceable along a longitudinal axis, wherein the plain bearing is configured to compensate for thermal expansions between the steering gear housing and the spindle nut.

2. The steering gear of claim 1 wherein the plain bearing is configured to set backlash between the coupling rod and the steering gear housing within defined limit values over an operating temperature range.

3. The steering gear of claim 1 wherein the plain bearing is form-fit connected to the steering gear housing, wherein sliding faces by which the plain bearing is in contact with the coupling rod are configured such that the plain bearing, in interplay with the coupling rod, forms an anti-twist device.

4. The steering gear of claim 1 wherein the plain bearing comprises a plain bearing bushing that surrounds the coupling rod.

5. The steering gear of claim 4 wherein the plain bearing bushing is comprised of a material that has a thermal expansion coefficient in a range from $2 \cdot 10^{-5} K^{-1}$ to $5 \cdot 10^{-4} K^{-1}$.

6. The steering gear of claim 4 wherein the plain bearing bushing is comprised of a material that has a thermal expansion coefficient of more than $2 \cdot 10^{-5} K^{-1}$.

7. The steering gear of claim 4 wherein the plain bearing bushing is comprised of a material that has a thermal expansion coefficient in a range from $2 \cdot 10^{-5} K^{-1}$ to $4 \cdot 10^{-4} K^{-1}$.

8. The steering gear of claim 4 wherein the plain bearing bushing is substantially cylindrical and includes a centrally arranged opening with a cross section that is non-circular and receives a corresponding non-round portion of the coupling rod in a mounted state so as to form an anti-twist device.

9. The steering gear of claim 4 wherein the plain bearing bushing comprises notches starting from a first end face, extending into a casing surface, and running parallel to the longitudinal direction.

10. The steering gear of claim 4 wherein an outside of the plain bearing bushing comprises spring arms that are evenly spaced apart in a circumferential direction and that bear on the steering gear housing in an installed state of the plain bearing bushing.

11. The steering gear of claim 10 wherein the spring arms are disposed on the outside of the plain bearing bushing between recesses of the plain bearing bushing, wherein the spring arms extend parallel to the longitudinal direction and, when viewed radially, lie in a region of a circular envelope of the plain bearing bushing.

12. The steering gear of claim 10 wherein free ends of the spring arms have protrusions that protrude from a circular envelope, wherein in the installed state the spring arms bear with their outsides fully superficially on the steering gear housing.

13. The steering gear of claim 10 wherein spring arms extend from an approximate middle of a casing height of the plain bearing bushing to a second end of the plain bearing bushing, wherein along the longitudinal axis the second end lies on an opposite side from a first end face assigned to a first end of the plain bearing bushing.

14. The steering gear of claim 4 wherein a seat in the steering gear housing for the plain bearing bushing is substantially cylindrical in cross section and has grooves extending in the longitudinal direction, wherein corresponding webs on an outside of the plain bearing bushing engage in the grooves to form an anti-twist device.

15. A steering gear for a steer-by-wire steering system of a motor vehicle, the steering gear comprising:
- a coupling rod mounted in a steering gear housing, wherein a threaded spindle is formed on the coupling rod and is surrounded by a spindle nut as part of a spiral gear; and
- a plain bearing that mounts the coupling rod in the steering gear housing such that the coupling rod is displaceable along a longitudinal axis, wherein the plain bearing is configured to compensate for thermal expansions between the steering gear housing and the spindle nut, wherein the plain bearing comprises (i) a plain bearing bushing that surrounds the coupling rod, and (ii) notches starting from a first end face, extending into a casing surface, and running parallel to the longitudinal direction.

16. The steering gear of claim 15 wherein the plain bearing is configured to set backlash between the coupling rod and the steering gear housing within defined limit values over an operating temperature range.

17. The steering gear of claim 15 wherein the plain bearing is form-fit connected to the steering gear housing, wherein sliding faces by which the plain bearing is in contact with the coupling rod are configured such that the plain bearing, in interplay with the coupling rod, forms an anti-twist device.

18. A steering gear for a steer-by-wire steering system of a motor vehicle, the steering gear comprising:
- a coupling rod mounted in a steering gear housing, wherein a threaded spindle is formed on the coupling rod and is surrounded by a spindle nut as part of a spiral gear; and
- a plain bearing that mounts the coupling rod in the steering gear housing such that the coupling rod is displaceable along a longitudinal axis, wherein the plain bearing is configured to compensate for thermal expansions between the steering gear housing and the spindle nut, wherein the plain bearing comprises a plain bearing bushing that surrounds the coupling rod;
- wherein a seat in the steering gear housing for the plain bearing bushing is substantially cylindrical in cross section and has grooves extending in the longitudinal direction, wherein corresponding webs on an outside of the plain bearing bushing engage in the grooves to form an anti-twist device.

19. The steering gear of claim 18 wherein the plain bearing bushing is substantially cylindrical and includes a centrally arranged opening with a cross section that is non-circular and receives a corresponding non-round portion of the coupling rod in a mounted state so as to form an anti-twist device.

20. The steering gear of claim 18 wherein an outside of the plain bearing bushing comprises spring arms that are evenly spaced apart in a circumferential direction and that bear on the steering gear housing in an installed state of the plain bearing bushing.

* * * * *